(12) United States Patent
Mori

(10) Patent No.: US 8,730,498 B2
(45) Date of Patent: May 20, 2014

(54) INFORMATION PROCESSING APPARATUS, CONTROL METHOD, AND COMPUTER-READABLE STORAGE MEDIUM

(75) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 12/756,028

(22) Filed: Apr. 7, 2010

(65) Prior Publication Data

US 2010/0259785 A1 Oct. 14, 2010

(30) Foreign Application Priority Data

Apr. 10, 2009 (JP) ................................. 2009-096144

(51) Int. Cl.
 *G06F 3/12* (2006.01)
 *G06K 15/00* (2006.01)
 *G06F 15/00* (2006.01)
 *G06Q 10/00* (2012.01)

(52) U.S. Cl.
 USPC .......... 358/1.15; 358/1.16; 358/1.9; 705/7.22

(58) Field of Classification Search
 USPC ............................... 705/7.22, 7.25, 7.26, 7.27
 See application file for complete search history.

(56) References Cited

U.S. PATENT DOCUMENTS

| 2005/0068547 | A1* | 3/2005 | Negishi et al. | .................. 358/1.1 |
| 2007/0127064 | A1 | 6/2007 | Kuroshima | |
| 2007/0136117 | A1* | 6/2007 | Matsueda | .......................... 705/7 |

FOREIGN PATENT DOCUMENTS

JP 2007-156671 A 6/2007

* cited by examiner

*Primary Examiner* — Thomas Lett
(74) *Attorney, Agent, or Firm* — Canon USA, Inc., IP Division

(57) ABSTRACT

An information processing apparatus for causing a printing apparatus to output content data included in a received print job as an output product according to information carried in a job ticket included in the print job includes an acquisition unit configured to acquire, out of a plurality of processing orders executable by the printing apparatus, information relating to a processing order that is executable by the printing apparatus when the print job is output as the output product, based on the information carried in the job ticket, a determination unit configured to determine the processing order to be executed by the printing apparatus when the print job is output, based on the information acquired by the acquisition unit, and a generation unit configured to generate a job ticket for the printing apparatus to execute the processing order determined by the determination unit.

21 Claims, 14 Drawing Sheets

INFORMATION PROCESSING APPARATUS, CONTROL METHOD, AND COMPUTER-READABLE STORAGE MEDIUM

BACKGROUND OF THE INVENTION

1. Field of the Invention

The present invention relates to an information processing apparatus for performing processing order determination control when a job ticket is converted among a plurality of printing systems, a control method, and a computer-readable storage medium.

2. Description of the Related Art

In the commercial printing industry, a commercial printing company receives an order for a request to produce printed products (magazine, newspaper, catalogue, advertisement, gravure, etc.) from a third party (customer, client), produces the printed product desired by the client, delivers the produced printed product to the client, and receives a fee from the client.

The use of a large-scale printing apparatus such as an offset type printing machine has dominated and still dominates this type of commercial printing industry. Work has been performed via various types of processes, described below. The processes include job entry, design, layout, comprehensive layout (presentation by printer output), proof reading (layout correction and color correction), proof print, block copy preparation, printing, post-processing, and shipping.

On the other hand, a market called print on demand (POD) has recently appeared against the above-mentioned commercial printing industry as electrophotographic printing apparatuses and ink-jet printing apparatuses have increased in speed and image quality. The POD aims at handling jobs in relatively small lots in a short delivery time without using a large-scale apparatus or a system. The POD has made the most of a digital image forming apparatus such as a digital copying machine or a digital multifunction peripheral (MFP) in place of the above-mentioned large-scale printing machine or printing method, to realize digital printing using electronic data.

In the POD market, digitization has been mixed better than in the conventional printing industry, so that management and control using a computer have infiltrated. In the POD market, a workflow including a plurality of processing processes (e.g., pre-print processing process, print processing process, and post-print processing process) is generated to obtain an output result. The printing system obtains an output result desired by a client efficiently by performing processing according to the processing processes in the workflow. There are few cases where one printing system includes all the processing processes in the workflow. A plurality of printing systems having different functions executes the processing processes in the workflow by performing communication on a network.

When the printing system receives a job ticket from a different printing system, as described above, the job ticket includes specific processing for only information required in another system area in many cases. The job ticket describes only abstract information based on a user's instruction for the processes executed in the printing system in many cases. In such cases, the printing system requires processing for converting the job ticket into a job ticket including specific information to be controlled within the system area. Japanese Patent Application Laid-Open No. 2007-156671 discusses a technique relating to print job conversion control in an information processing apparatus for converting a print job among a plurality of printing systems having different functions.

In the technique discussed in Japanese Patent Application Laid-Open No. 2007-156671, functional information of a printing apparatus in the printing system is acquired, and the print job is converted based on work instruction data and content data. However, the technique discussed in Japanese Patent Application Laid-Open No. 2007-156671 does not consider a processing order to be executed in the printing apparatus because the functional information is acquired for each processing performed in the printing apparatus to convert the print job. Therefore, the print job may be executed in an erroneous order.

When a plurality of options having the same function exists in one printing apparatus, for example, it may not be found which of the options may be used to execute the print job. The print job is executed in a processing order different from a processing order desired by a client so that the obtained output product may differ from that desired by the client. Alternatively, the job ticket may be converted in a processing order that is nonexecutable by the printing apparatus, so that the print job may be canceled.

SUMMARY OF THE INVENTION

According to an aspect of the present invention, an information processing apparatus for causing a printing apparatus to output content data included in a received print job as an output product according to information carried in a job ticket included in the print job includes an acquisition unit configured to acquire, out of a plurality processing orders executable by the printing apparatus, information relating to a processing order that is executable by the printing apparatus when the print job is output as the output product, based on the information carried in the job ticket, a determination unit configured to determine a processing order to be executed by the printing apparatus when the print job is output, based on the information acquired by the acquisition unit, and a generation unit configured to generate a job ticket for the printing apparatus to execute the processing order determined by the determination unit.

According to an exemplary embodiment of the present invention, the execution of a print job in an erroneous order can be prevented by uniquely determining a processing order in which the print job can be executed based on information relating to the processing order executable by the printing apparatus and information carried in the job ticket.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
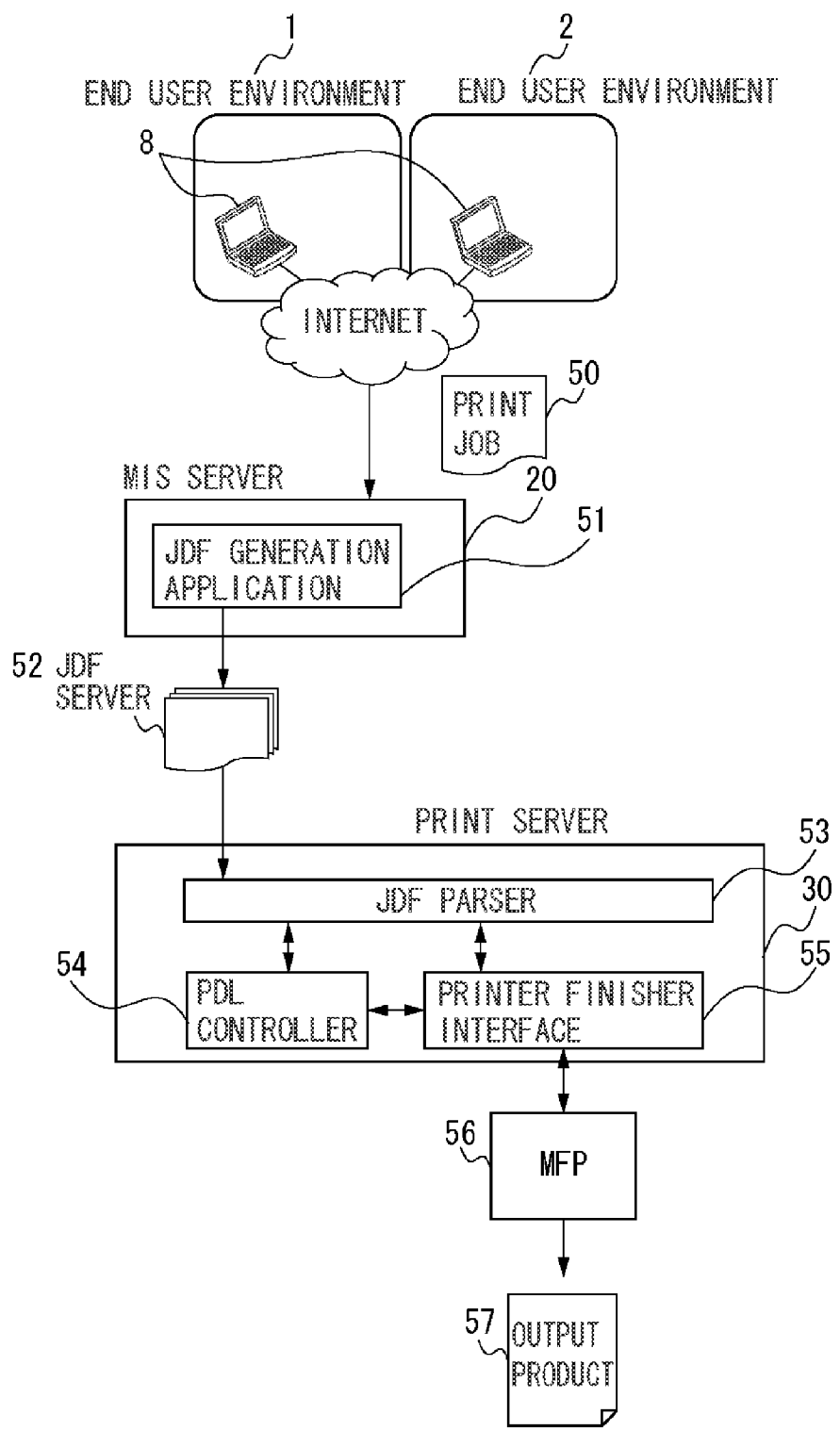
FIG. 1 illustrates an example of a configuration of a printing system according to an exemplary embodiment of the present invention.

FIG. 1 is a block diagram illustrating an example of the basic configuration of a printing system according to an exemplary embodiment of the present invention. Clients who order printing respectively exist in end user environments 1 and 2. The clients use their respective client personal computers (PCs) 8 from the end user environments 1 and 2, to order a print job 50 from a management information system (MIS) server 20.

The MIS server 20 is an information processing apparatus applied in the present exemplary embodiment. The MIS server 20 includes a job definition format (JDF) generation application 51 for generating JDF data 52 corresponding to a job ticket describing a work instruction in a workflow based on the print job 50. The print job 50 is sent from the end user environments 1 and 2 and is subjected to printing and post-processing in a multifunction peripheral (MFP) 56 serving as a printing apparatus according to the present exemplary embodiment via the MIS server 20 and a print server 30. The print job 50 includes content data and a job ticket serving as work instruction data. The content data includes data to be printed, for example, a document file and a portable document format (PDF) file, and the job ticket includes JDF data 52. The content data and the job ticket are not limited to the above-mentioned examples. They may have other formats.

The print server 30 receives the print job 50 to be inserted into the MFP 56 from the MIS server 20 while interrupting the job ticket included in the print job 50 and performing control for the MFP 56 to print the content data included in the print job 50. The print server 30 includes a JDF parser 53, a page description language (PDL) controller 54, and a printer finisher interface 55. The JDF parser 53 interrupts the JDF data 52. The PDL controller 54 processes various types of PDL data such as PDF/PostScript (PS) data. The printer finisher interface 55 connects a printer engine of the MFP 56 and the print server 30, to perform various types of communication.

The MFP 56 is a printing apparatus applied in the present exemplary embodiment, and outputs the print job 50 received from the print server 30 as an output product 57.

The operations of the workflow by the job ticket executed in the printing system illustrated in FIG. 1 will be described below.

When the print job 50 is inserted into the MIS server 20, the JDF generation application 51 installed in the MIS server 20 generates the JDF data 52 corresponding to the job ticket included in the received print job 50 based on a worker's operation. Processing for generating the job ticket includes at least one of processing for changing the content of the job ticket and processing for converting the format of the job ticket.

When the print job 50 including the generated JDF data 52 is passed to the print server 30, the JDF parser 53 in the print server 30 interrupts the JDF data 52, to execute a job corresponding to the MFP 56. For example, attributes such as an output sheet size, two-sided/one-sided printing, and N-up printing are designated in the JDF data 52. The JDF parser 53 interprets the attributes. The PDF controller 54 processes the PDL data such as PDF/PS data according to the content of the JDF data 52. The PDF controller 54 performs control to execute print processing and post-processing of the content data for the MFP 56 via the printer finisher interface 55 and output the output product 57.

Figure 2:
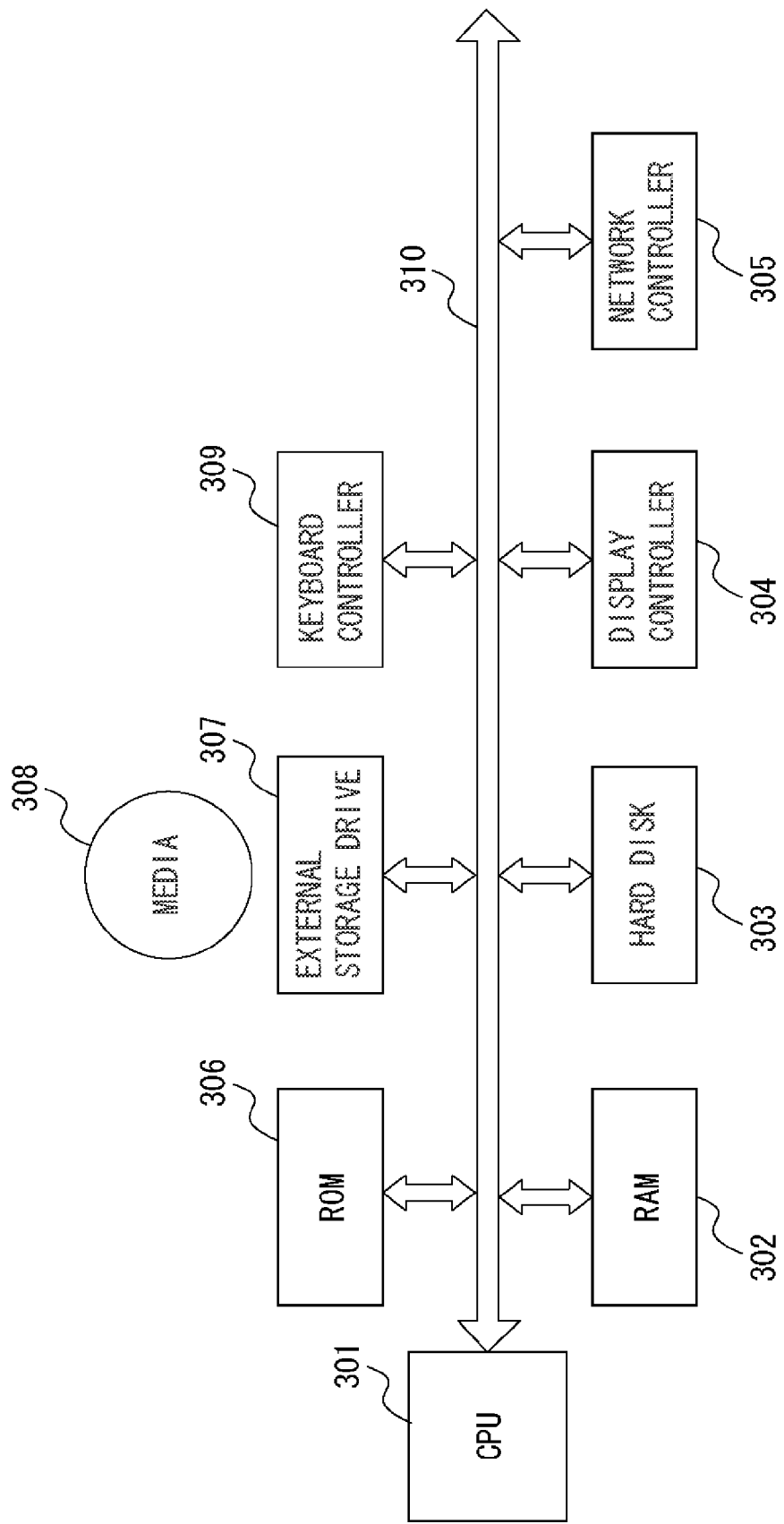
FIG. 2 is a block diagram illustrating the internal structure of an MIS server.

FIG. 2 is a block diagram illustrating the internal configuration of the MIS server 20. A central processing unit (CPU) 301 executes a program stored in a program area inside a read-only memory (ROM) 306, or a program such as an operating system (OS), a general-purpose application, or the JDF generation application 51, which is loaded into a random access memory (RAM) 302 from a hard disk (HD) 303. The RAM 302 functions as a main memory, a work area, or the like for the CPU 301. The hard disk 303 stores the JDF generation application 51, a boot program, various applications, font data, a user file, an electronic document file, and others. A display controller 304 performs display control by a display (not illustrated). A network controller 305 executes communication control processing to another device connected to a network. A keyboard controller 309 controls key input from a keyboard and a pointing device (not illustrated). The CPU 301 is connected to each of the blocks via an internal bus 310.

Figure 3:
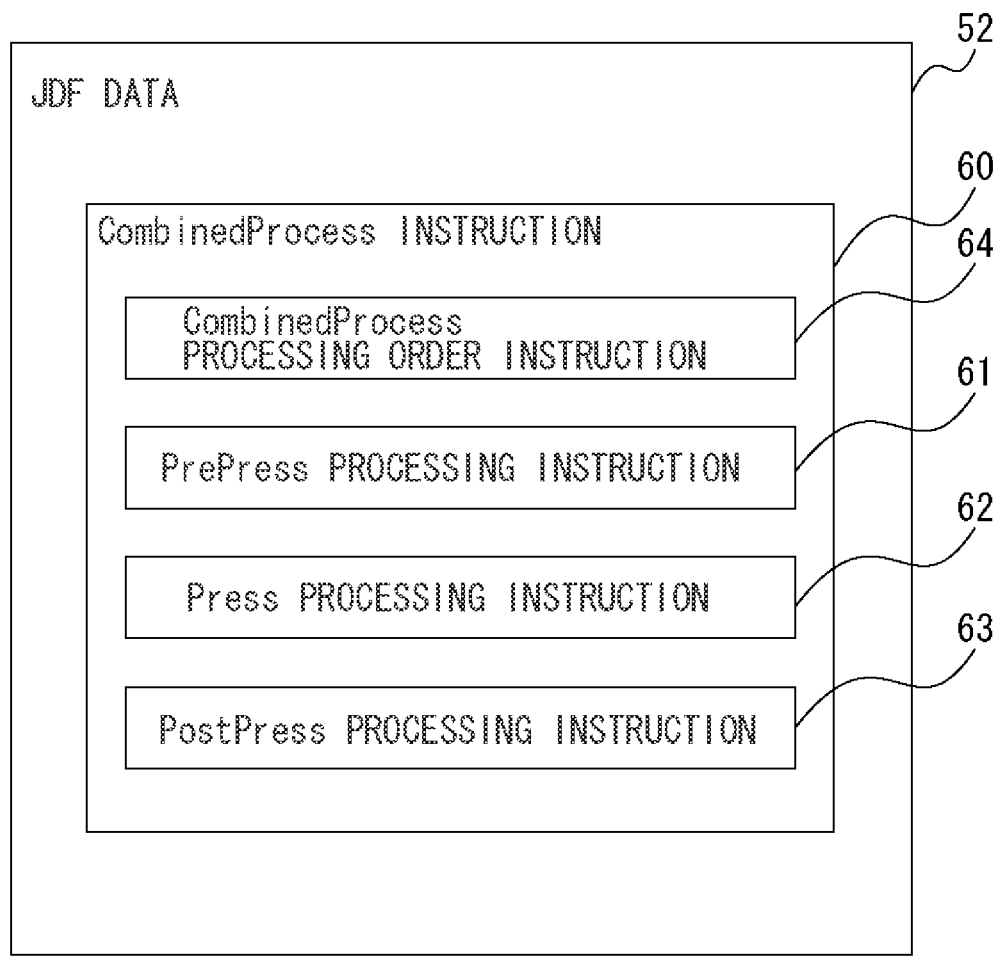
FIG. 3 illustrates an example of the structure of a job ticket in a POD system.

The structure of the job ticket in a POD system will be described with reference to FIGS. 3 and 4. FIG. 3 illustrates an example of the structure of the job ticket in the POD system. As illustrated in FIG. 3, the structure of the job ticket includes the whole JDF data 52.

A PrePress processing instruction 61 describes a plurality of PrePress processing instruction groups indicating how content data such as a PDF file is image-processed and arranged, for example.

A Press processing instruction 62 describes a plurality of Press processing instruction groups indicating how image data generated according to the PrePress processing instruction 61 is output, for example.

A PostPress processing instruction 63 describes a plurality of PostPress processing instruction groups indicating how a document output according to the Press processing instruction 62 is subjected to post-processing such as case bookbinding.

A CombinedProcess instruction 60 describes an instruction for CombinedProcess processing. The CombinedProcess processing is used to collect the PrePress processing instruction 61, the Press processing instruction 62, and the PostPress processing instruction 63 as one processing when one device processes the instructions.

A CombinedProcess processing order instruction 64 in the CombinedProcess instruction 60 describes in which order a plurality of instructions included in the PrePress processing instruction 61, the Press processing instruction 62, and the PostPress processing instruction 63 is to be processed. The details thereof will be described with reference to FIG. 4.

The CombinedProcess instruction 60 is used when the same device performs PrePress processing (pre-print processing)+Press processing (print processing)+PostPress processing (post-print processing) for each data input. The CombinedProcess processing order instruction 64 is used to issue an instruction for a processing order of a plurality of instructions to uniquely determine an output product obtained by the plurality of instructions. The CombinedProcess processing is used for an MFP having at least two of the functions of the PrePress processing, the Press processing, and the PostPress processing. The PrePress processing, the Press processing, and the PostPress processing are collectively defined as output processing. For example, printing is one type of output processing, and post-processing such as folding processing and punching processing is one type of output processing.

Figure 4:
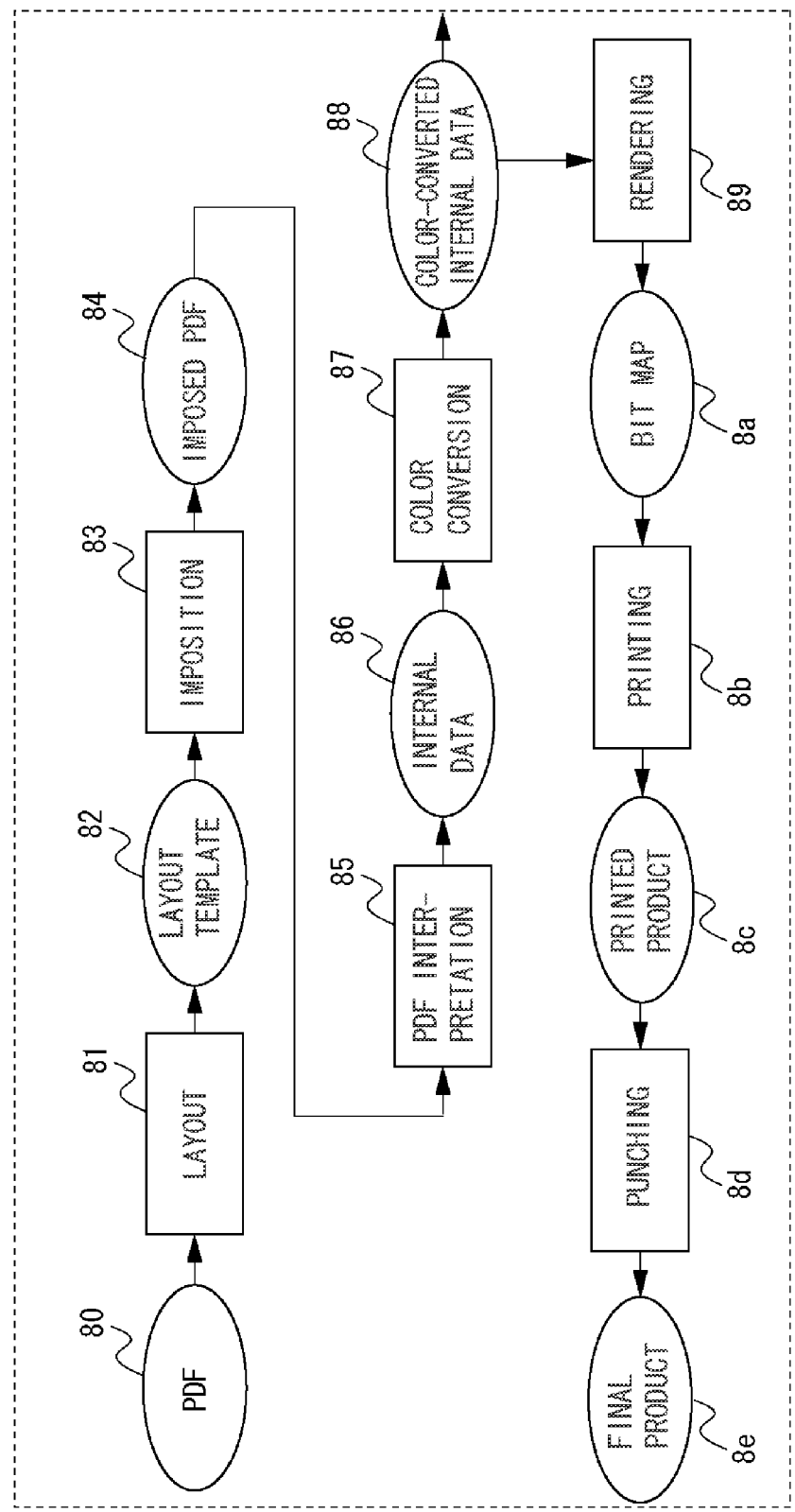
FIG. 4 illustrates an example of a processing order in the job ticket in the POD system.

FIG. 4 illustrates an example of the processing order in the CombinedProcess instruction 60 in the JDF data 52. In the example illustrated in FIG. 4, the PrePress processing instruction 61 (layout 81, imposition 83, PDF interpretation 85, color conversion 87, rendering 89), the Press processing instruction 62 (printing 8b), and the PostPress processing instruction 63 (punching 8d) are processed in this order.

A workflow in the JDF data 52 mainly includes processes and resources. The process represents processing in one unit in the workflow. The processes include the imposition 83, the color conversion 87, the printing 8b, and the punching 8d. The resource represents a parameter or a resource input to each process, or an intermediate product or a final product output after each process is completed. The resources include a PDF 80, a bit map 8a, and a printed product 8c. In the CombinedProcess processing order instruction 64, a plurality of processes to and from which resources are input and output is continuous.

Figure 5:
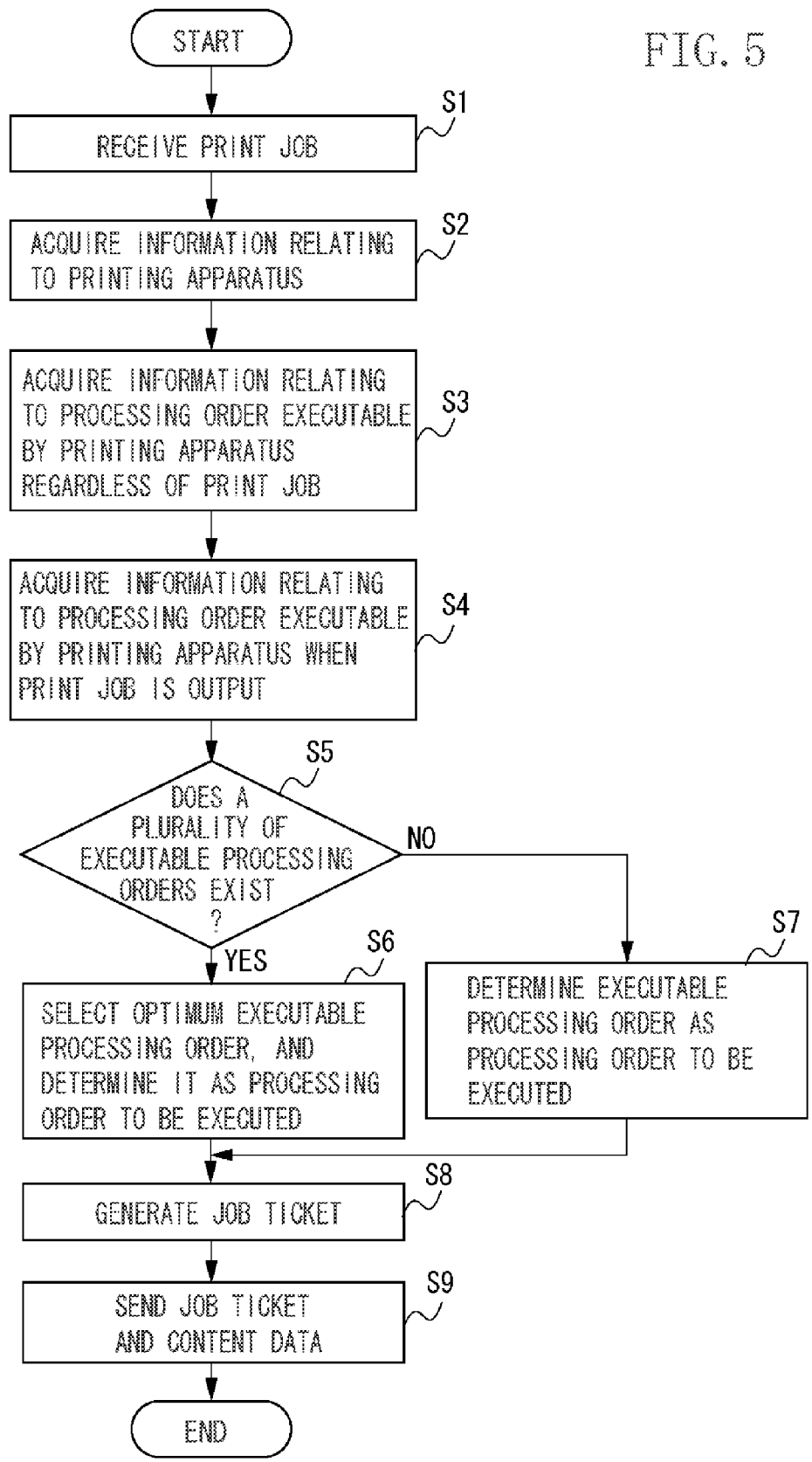
FIG. 5 is a flowchart illustrating the flow of the whole processing according to an exemplary embodiment of the present invention.

FIG. 5 is a flowchart illustrating an example of the procedure for control processing in the MIS server 20. The CPU 301 in the MIS server 20 executes a program for the JDF generation application 51 stored in the HD 303, to implement each of processes in the flowchart.

In step S1, the CPU 301 receives the print job 50 including the job ticket and the content data from the end user environments 1 and 2. The received job ticket and content data are stored in the HD 303. The job ticket assumes the JDF data 52. The CPU 301 interprets the received JDF data 52.

In step S2, the CPU 301 requires the print server 30 to acquire information relating to the MFP 56, which is registered in the print server 30, via the network. The information relating to the MFP 56 will be described with reference to FIGS. 6A and 6B.

Figure 6A:
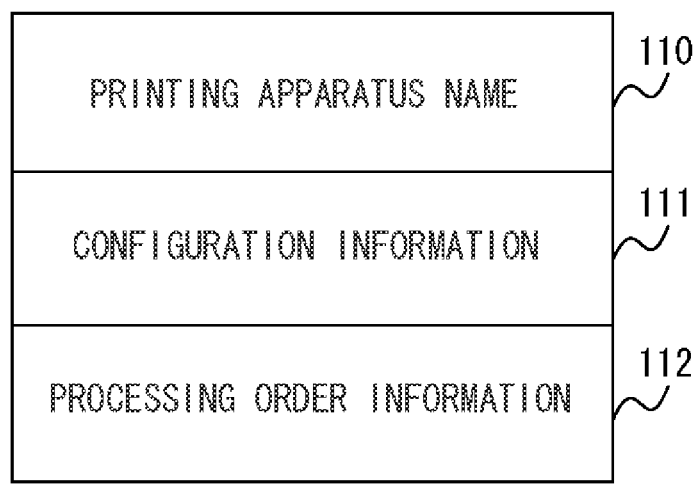
FIG. 6A is a conceptual diagram illustrating an example of information relating to a printing apparatus.
Figure 6B:
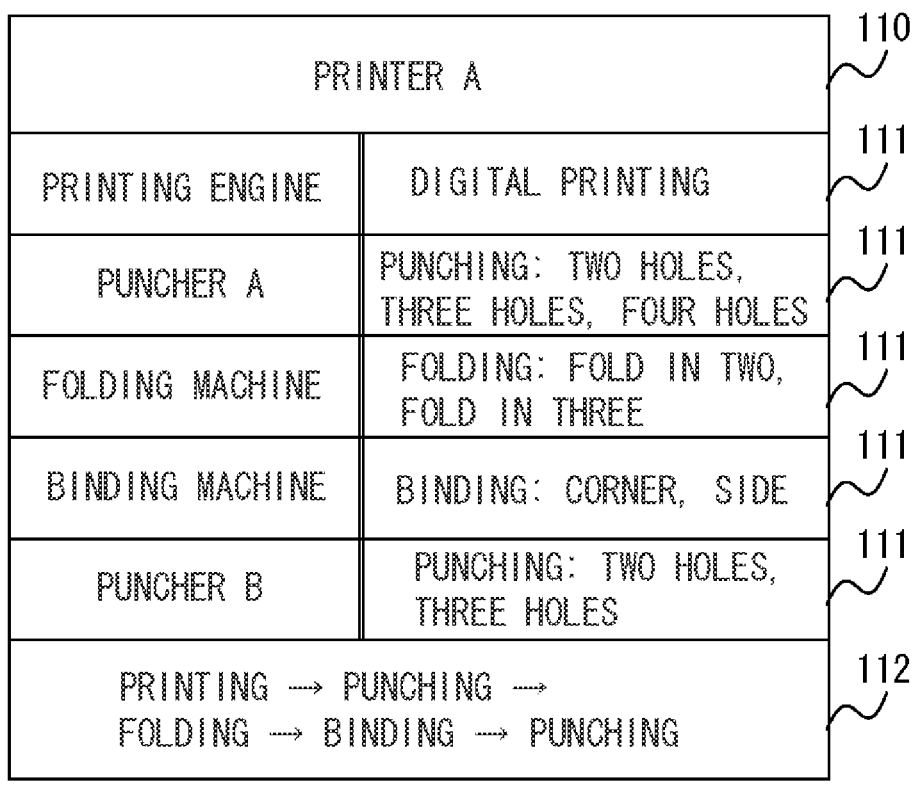
FIG. 6B illustrates a specific example of the information relating to the printing apparatus.

FIGS. 6A and 6B illustrate an example of the information relating to the printing apparatus (MFP 56). FIG. 6A is a conceptual diagram of the information relating to the printing apparatus. A printing apparatus name 110 is information relating to the name of the printing apparatus. Configuration information 111 is information relating to the configuration of the printing apparatus, and includes information relating to the name of an option mounted on the printing apparatus and a function performed by the option. Executable processing order information 112 is information relating to a processing order executable by the printing apparatus regardless of the content of the print job 50 based on the configuration information 111.

FIG. 6B illustrates a specific example of the information relating to the printing apparatus. In FIG. 6B, two punchers, one folding machine, and one binding machine are mounted on the printing apparatus. As can be seen from FIG. 6B, a printing apparatus named "printer A" includes a printing engine, a puncher A, a folding machine, a binding machine, and a puncher B. If the processing order is digital print processing, punching processing, folding processing, binding processing, and punching processing, any process in the processing can be executed.

The information relating to the printing apparatus may be directly required of the printing apparatus. Alternatively, the information relating to the configuration of the printing apparatus connected to the MIS server 20 may be previously stored in the HD 303 and acquired from the HD 303.

In step S3, the CPU 301 acquires, from the information relating to the MFP 56 acquired in step S2, information relating to processing orders executable as the printing apparatus by the MFP 56 regardless of the content of the print job 50.

The information relating to the processing order executable as the printing apparatus by the MFP 56 regardless of the content of the print job 50 may be acquired from the executable processing order information 112 included in the information relating to the printing apparatus (MFP 56) acquired in step S2. Alternatively, it may be derived by the CPU 301 based on the configuration information 111. The latter case can also cope with a case where the information relating to the printing apparatus does not include the executable processing order information 112 and only the configuration information 111 can be acquired.

In step S4, the CPU 301 acquires, out of the information relating to the processing orders acquired in step S3 and information carried in the job ticket (JDF data 52), information relating to the processing order executable by the MFP 56 when the print job 50 is output as an output product. The details of the acquisition process in step S4 will be described below.

In step S5, the CPU 301 determines whether a plurality of processing orders executable by the MFP 56 when the print job 50 is output as the output product exists from the information acquired in step S4. If the CPU 301 determines that the plurality of processing orders exists (YES in step S5), the processing proceeds to step S6. On the other hand, if the CPU 301 determines that the plurality of processing orders does not exist (NO in step S5), the processing proceeds to step S7.

In step S6, the CPU 301 selects, out of the plurality of executable processing orders, the optimum executable processing order, and determines the selected executable processing order as a processing order to be executed by the MFP 56 when the print job 50 is output. The optimum processing order includes a processing order executable in a short processing time in the MFP 56. The optimum processing order may be selected using not only the short processing time but also other standards such as a small number of processing processes and low power consumption. The optimum processing order may be switchable by a client selecting a plurality of standards. Even when the plurality of processing orders executable by the MFP 56 exists, the efficiency of output processing can be increased by determining the optimum processing order as a processing order to be executed.

In step S7, the CPU 301 determines the executable processing order as a processing order to be executed by the MFP 56 when the print job 50 is output.

In step S8, the CPU 301 generates a job ticket enabling the MFP 56 to execute the executable processing order determined in step S6 or S7 by describing the processing order in the job ticket. The job ticket also assumes the JDF data, and describes information relating to the processing order to be executed by the MFP 56 when the print job 50 is output according to the CombinedProcess processing order instruction 64.

In step S9, the CPU 301 sends the job ticket generated in step S8 and the content data stored in the HD 303 to the print server 30 via the network controller 305.

The job ticket and the content data sent in step S9 are sent to the MFP 56 via the print server 30, and the output processing is executed in the processing order determined in step S6 or S7 according to information carried in the job ticket.

The execution of the above-mentioned processing processes enables the processing order in the print job 50 to be determined as the optimum processing order executable by the MFP 56, to prevent the print job 50 from being executed in an erroneous processing order.

The details of the acquisition process in step S4 in the flowchart illustrated in FIG. 5 will be then described by taking the acquisition of information relating to a processing order for post-processing as an example with reference to FIGS. 7A to 7D. The following description can apply equally to not only the post-processing but also other output processing such as pre-print processing and print processing.

Figure 7A:
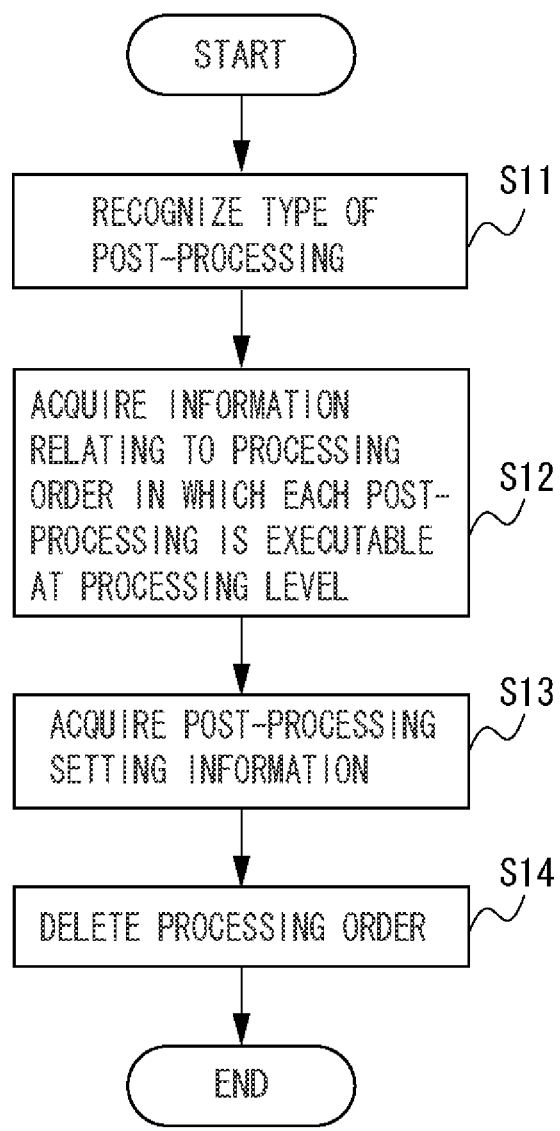
FIG. 7A is a flowchart illustrating the detailed flow of step S4 illustrated in FIG. 5.

FIG. 7A is a flowchart illustrating the details of the acquisition process in step S4 in the flowchart illustrated in FIG. 5. The CPU 301 in the MIS server 20 executes a program for the JDF generation application 51 stored in the HD 303, to implement each of processes in the flowchart illustrated in FIG. 7A.

In step S11, the CPU 301 extracts the PostPress processing instruction 63 in the JDF data 52, and recognizes the type of the post-processing in the output processing included in the print job 50.

In step S12, the CPU 301 compares the recognized type of the post-print processing with the information relating to the processing orders executable as the printing apparatus by the MFP 56 regardless of the content of the print job 50, which has been acquired in step S3, and acquires information relating to the processing order in which the MFP 56 can execute each post-processing included in the print job 50 at a processing level by the comparison. The processing order executable at the processing level does not consider detailed setting of each processing (e.g., pages on which partial folding begins and ends) but considers only the type of the processing. The processing order executable at the processing level includes a processing order actually nonexecutable and a processing order in which an output product different from an output product desired by a client is output. Even if the MFP 56 can execute both a processing order from folding to binding and a processing order from binding to folding at the processing level, for example, the processing order from binding to folding cannot actually be executed when the folding processing is set to partial folding. It is assumed that the MFP 56 can execute both a processing order from folding to punching and a processing order from punching to folding at the processing level, for example. In this case, if the processing order from folding to punching is executed, a punching position is shifted by the folding processing depending on a set folding method and punching position. Therefore, an output product different from an output product desired by a client is output. The output product different from the output product desired by the client is obtained when the position where output processing is executed, for example, a punching position or a cutting position, differs from a position set in the information carried in the job ticket.

In step S13, the CPU 301 confirms the PostPress processing instruction 63 in the JDF data 52, and acquires post-processing setting information indicating how setting is made in each of post-processing processes in the print job 50.

In step S14, the CPU 301 deletes, out of the processing orders executable at the processing level, the processing order nonexecutable by the MFP 56 when the post-processing is executed based on the acquired post-processing setting information from processing order candidates. Alternatively, the CPU 301 deletes the processing order in which the output product different from the output product desired by the client is output from the processing order candidates. The CPU 301 takes the processing order that has not been deleted as a processing order executable by the MFP 56 when the print job 50 is output, and acquires information relating to the processing order.

Specific examples in which the CPU 301 determines an executable processing order will be described according to the flowchart illustrated in FIG. 7A.

The first specific example is a case where the post-processing includes partial post-processing and post-processing for integrating the whole content data. The partial post-processing is post-processing performed for not all pages of the content data included in the print job 50 but parts thereof, for example, sub-set stapling. The post-processing for integrating the whole content data is post-processing performed to collect pages processed after the processing into one output product, for example, stapling (binding) processing and folding processing. In this case, if the post-processing for integrating the whole content data precedes the partial post-processing, the partial post-processing cannot be executed. Therefore, the partial post-processing is to precede the post-processing for integrating the whole content data.

Figure 7B:
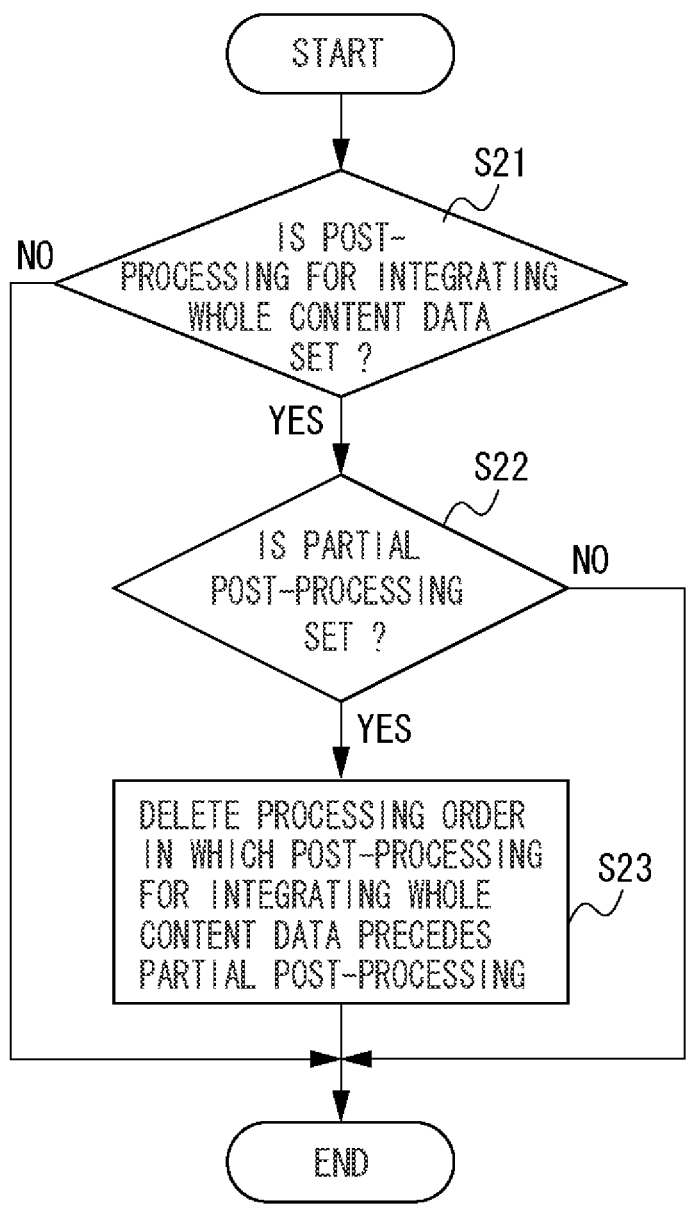
FIG. 7B is a flowchart illustrating the flow of a specific example 1 of step S4 illustrated in FIG. 5.

FIG. 7B is a flowchart illustrating the details of step S14 in the flowchart illustrated in FIG. 7A when both the post-processing for integrating the whole content data and the partial post-processing are set. The CPU 301 in the MIS server 20 executes a program for the JDF generation application 51 stored in the HD 303, to implement each of processes in the flowchart illustrated in FIG. 7B. The MFP 56 presupposes that either of the post-processing for integrating the whole content data and the partial post-processing can precede the other post-processing when both of them are set in the whole content data. For example, when the post-processing for integrating the whole content data is folding processing, and the partial post-processing is binding processing, both a processing order from folding to binding and a processing order from binding to folding can be executed.

In step S21, the CPU 301 acquires information relating to the post-processing set in the whole content data from the post-processing setting information acquired in step S13, and determines whether the post-processing for integrating the whole content data is set. If the CPU 301 determines that the post-processing for integrating the whole content data is not set (NO in step S21), the processing ends without deleting processing order candidates. On the other hand, if the CPU 301 determines that the post-processing for integrating the whole content data is set (YES in step S21), the processing proceeds to step S22.

In step S22, the CPU 301 determines whether the partial post-processing is set from the post-processing setting information acquired in step S13. If the CPU 301 determines that the partial post-processing is not set (NO in step S22), the processing ends without deleting the processing order candidates. On the other hand, if the CPU 301 determines that the partial post-processing is set (YES in step S22), the processing proceeds to step S23.

In step S23, the CPU 301 deletes a processing order in which the post-processing for integrating the whole content data precedes the partial post-processing, as a processing order nonexecutable by the MFP 56 from the processing order candidates.

By the foregoing processing processes, a job ticket in which the partial post-processing can reliably precede the post-processing for integrating the whole content data can be generated even when the post-processing includes the partial post-processing and the post-processing for integrating the whole content data. This can prevent situations where the printing apparatus cannot execute the processing order so that the print job 50 is canceled or converted again in the printing apparatus, to enable an increase in output efficiency in the printing apparatus.

Figure 9A:
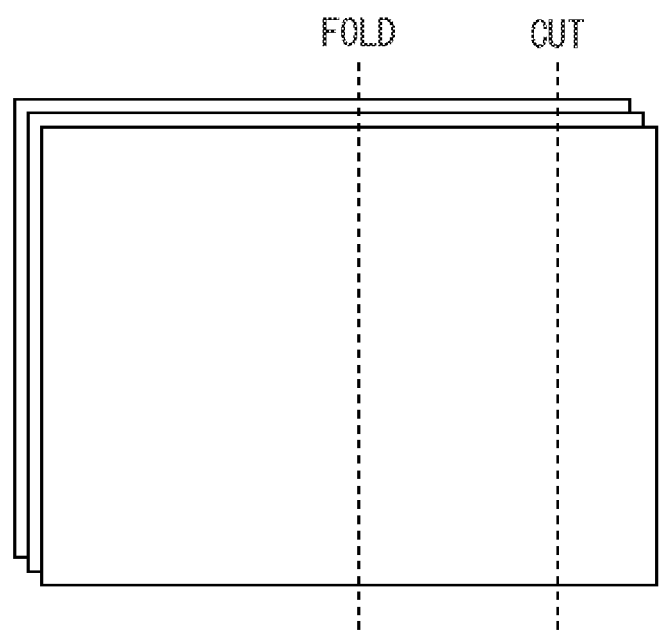
FIG. 9A illustrates a folding direction parallel to a cutting direction.

The second specific example is a case where the post-processing includes folding processing and cutting processing in which a cutting position is shifted by the folding processing. In this case, if the folding processing precedes the cutting processing, the cutting position is shifted due to an overlap of sheets by the folding processing. As a result, an output product different from an output product desired by a client is output. Therefore, the cutting processing is to precede the folding processing. The cutting processing in which the cutting position is shifted by the folding processing is performed in a direction parallel to a folding direction, as illustrated in FIG. 9A, for example.

Figure 7C:
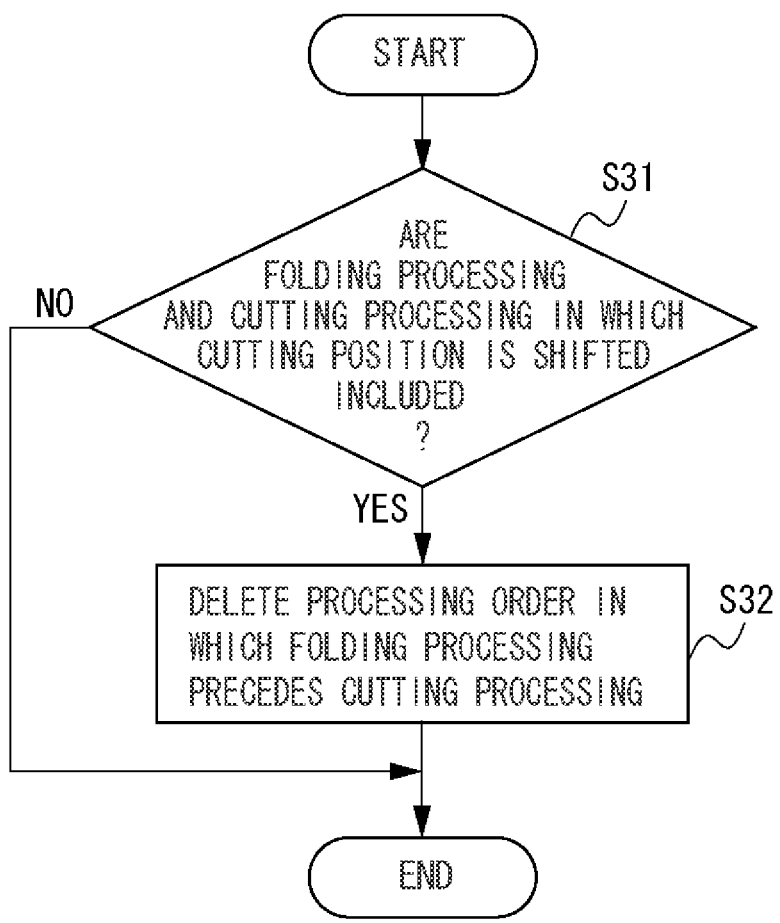
FIG. 7C is a flowchart illustrating the flow of a specific example 2 of step S4 illustrated in FIG. 5.

FIG. 7C is a flowchart illustrating the details of step S14 in the flowchart illustrated in FIG. 7A when both the folding processing and the cutting processing in which the cutting position is shifted by the folding processing are set. The CPU 301 in the MIS server 20 executes a program for the JDF generation application 51 stored in the HD 303, to implement each of processes in the flowchart illustrated in FIG. 7C. The MFP 56 presupposes that either of the folding processing and the cutting processing can precede the other processing when both of them are set in the whole content data.

In step S31, the CPU 301 acquires information relating to the post-processing set in the whole content data from the post-processing setting information acquired in step S13, and determines whether the post-processing includes the folding processing and the cutting processing in which the cutting position is shifted by the folding processing based on the acquired information relating to the post-processing. If the CPU 301 determines that the post-processing does not include the folding processing and the cutting processing in which the cutting position is shifted by the folding processing (NO in step S31), the processing ends without deleting processing order candidates. On the other hand, if the CPU 301 determines that the post-processing includes the folding processing and the cutting processing in which the cutting position is shifted by the folding processing (YES in step S31), the processing proceeds to step S32.

In step S32, the CPU 301 deletes a processing order in which the folding processing precedes the cutting processing, as a processing order in which an output product different from an output product desired by a client is output, from the processing order candidates.

By the foregoing processing processes, a job ticket in which the cutting processing in which the cutting position is shifted by the folding processing can reliably precede the folding processing can be generated even when the post-processing includes the folding processing and the cutting processing in which the cutting position is shifted by the folding processing. This can prevent the output product different from the output product desired by the client from being output due to the shift in the cutting position by the folding processing.

The third specific example is a case where the post-processing includes folding processing and punching processing. In this case, if the folding processing precedes the punching processing, a punching position is shifted due to an overlap of sheets by the folding processing. As a result, an output product different from an output product desired by a client is output. Therefore, the punching processing is to precede the folding processing.

Figure 7D:
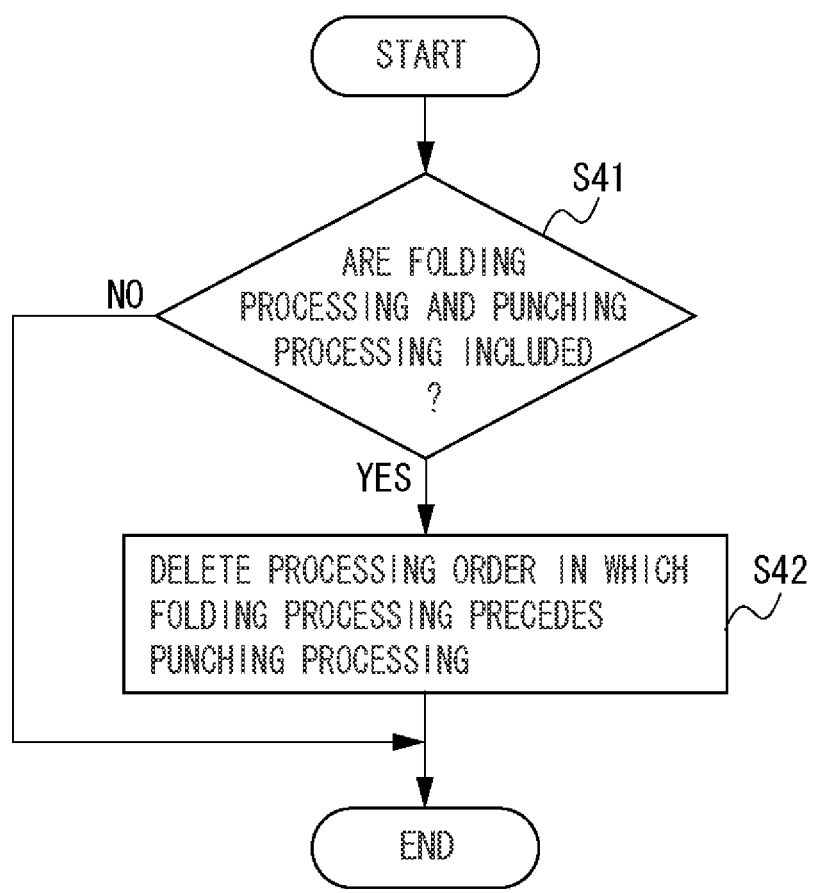
FIG. 7D is a flowchart illustrating the flow of a specific example 3 of step S4 illustrated in FIG. 5.

FIG. 7D is a flowchart illustrating the details of step S14 in the flowchart illustrated in FIG. 7A when both the folding processing and the punching processing are set. The CPU 301 in the MIS server 20 executes a program for the JDF generation application 51 stored in the HD 303, to implement each of processes in the flowchart illustrated in FIG. 7D. The MFP 56 presupposes that either of the folding processing and the punching processing can precede the other processing when both of them are set in the whole content data.

In step S41, the CPU 301 acquires information relating to the post-processing set in the whole content data from the post-processing setting information acquired in step S13, and determines whether the post-processing includes the folding processing and the punching processing. If the CPU 301 determines that the post-processing does not include the folding processing and the punching processing (NO in step S41), the processing ends without deleting processing order candidates. On the other hand, if the CPU 301 determines that the post-processing includes the folding processing and the punching processing (YES in step S41), the processing proceeds to step S42.

In step S42, the CPU 301 deletes a processing order in which the folding processing precedes the punching processing, as a processing order in which an output product different from an output product desired by a client is output, from the processing order candidates.

By the foregoing processing processes, a job ticket in which the punching processing can reliably precede the folding processing can be generated even when the post-processing includes the folding processing and the punching processing. This can prevent the output product different from the output product desired by the client from being output due to the shift in the punching position by the folding processing.

Figure 8:
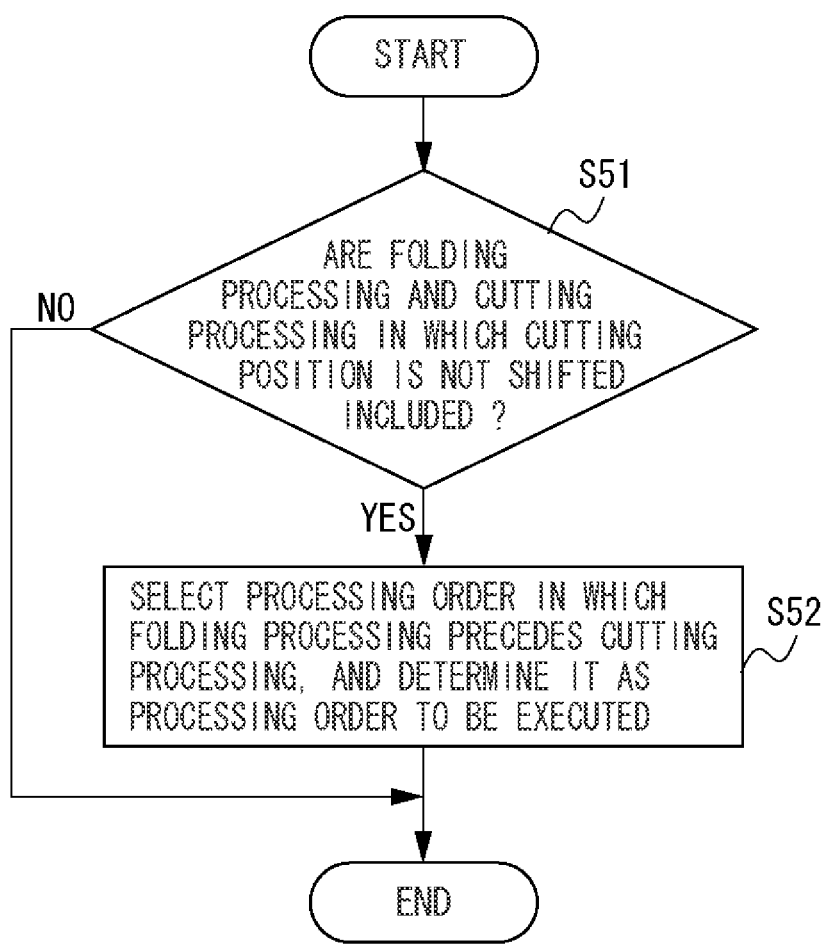
FIG. 8 is a flowchart illustrating the flow of a specific example of step S6 illustrated in FIG. 5.

A specific example of processing for selecting the optimum processing order in step S6 in the flowchart illustrated in FIG. 5 will be described by taking the acquisition of information relating to a processing order for post-processing as an example with reference to FIG. 8. The following description can apply equally to not only the post-processing but also other output processing such as pre-print processing and print processing. FIG. 8 is a flowchart illustrating a specific example of the processing for selecting the optimum processing order in step S6 in the flowchart illustrated in FIG. 5. The CPU 301 in the MIS server 20 executes a program for the JDF generation application 51 stored in the HD 303, to implement each of the processes in the flowchart illustrated in FIG. 7A.

Figure 9B:
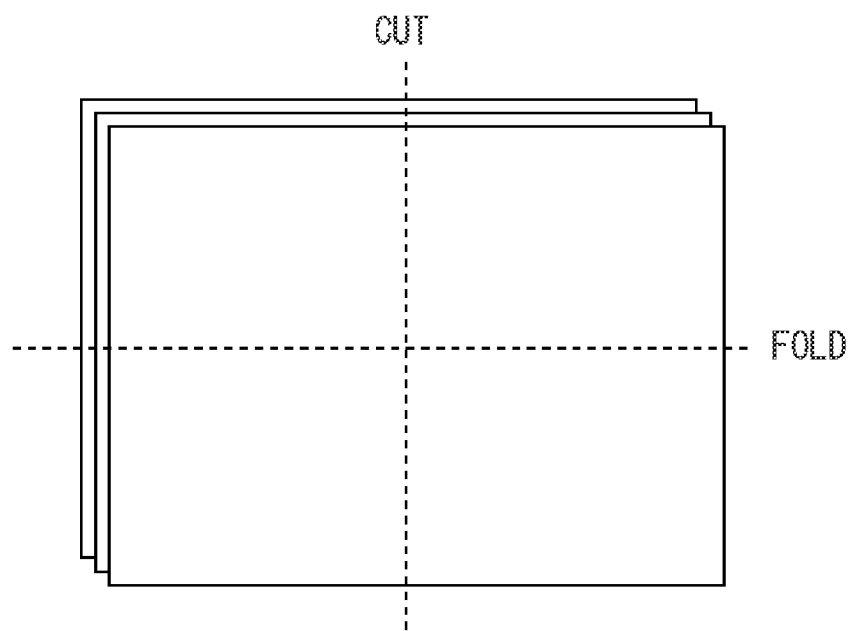
FIG. 9B illustrates a folding direction perpendicular to a cutting direction.

The specific example is a case where the post-processing includes folding processing and cutting processing in which a cutting position is not shifted by the folding processing. In this case, even if the folding processing precedes the cutting processing, the cutting position is not shifted. More specifically, which of an order from folding to cutting and an order from cutting to folding is selected, the same output product is output. In step S14 in the flowchart illustrated in FIG. 7A, the CPU 301 does not delete the processing order. Therefore, in the flowchart illustrated in FIG. 5, the CPU 301 determines that the plurality of processing orders exists in step S5, and selects the optimum processing order in step S6. The cutting processing in which the cutting position is not shifted by the folding processing is performed in a direction perpendicular to a folding direction, as illustrated in FIG. 9B, for example.

FIG. 8 is a flowchart illustrating the details of step S6 in the flowchart illustrated in FIG. 5 when both the folding processing and the cutting processing in which the cutting position is not shifted by the folding processing are set. The CPU 301 in the MIS server 20 executes a program for the JDF generation application 51 stored in the HD 303, to implement each of processes in the flowchart illustrated in FIG. 8. The MFP 56 presupposes that either of the folding processing and the cutting processing can precede the other processing when both of them are set in the whole content data.

In step S51, the CPU 301 acquires information relating to the post-processing set in the whole content data from the post-processing setting information acquired in step S13, and determines whether the post-processing includes the folding processing and the cutting processing in which the cutting position is not shifted by the folding processing. If the CPU 301 determines that the post-processing does not include the folding processing and the cutting processing in which the cutting position is not shifted by the folding processing (NO in step S51), the performance of the printing apparatus is not changed whichever processing precedes the other processing. Therefore, the CPU 301 selects either of the processing orders, and determines the selected processing order as a processing order to be executed by the MFP 56 when the print job 50 is output. On the other hand, if the CPU 301 determines that the post-processing includes the folding processing and the cutting processing in which the cutting position is not shifted by the folding processing (YES in step S51), the processing proceeds to step S52.

In step S52, the CPU 301 selects a processing order in which the folding processing precedes the cutting processing as the optimum processing order from processing order candidates, and determines the selected processing order as a processing order to be executed when the print job 50 is output. When the cutting processing precedes the folding processing, the number of sheets to be subjected to the folding processing is two times larger so that a longer period of time is required than when the folding processing precedes the cutting processing.

By the foregoing processing processes, a job ticket in which the folding processing can precede the cutting processing in which the cutting position is not shifted by the folding processing can be generated even when the post-processing includes the folding processing and the cutting processing in which the cutting position is not shifted by the folding processing. This enables a processing order in which the performance of the printing apparatus is higher to be executed even when the same output product is obtained, to enable an improvement in output efficiency.

In the present exemplary embodiment, the information relating to the processing order in which the printing apparatus (the MFP 56) can execute each post-processing included in the print job 50 at the processing level is acquired by comparing the previously acquired information relating to the processing orders executable by the MFP 56 with the information carried in the job ticket. However, the present invention is not limited to this method. For example, a method for previously recognizing the processing content of the print job 50 based on the information carried in the job ticket and acquiring only processing order information relating to the recognized processing content may be used. This method enables only information required to acquire information relating to the MFP 56 to be acquired from the print server 30 or the MFP 56, resulting in increased information acquisition efficiency.

In the present exemplary embodiment, the information processing apparatus (MIS server 20) has been described as a component separate from the printing apparatus (MFP 56). However, the present invention is not limited to this configuration. The information processing apparatus according to the present invention may be included in the processing apparatus.

The present invention includes all combinations of the configurations of the above-mentioned exemplary embodiments and their modified examples. The present invention can be implemented by an exemplary embodiment of a system, an apparatus, a method, a program, or a storage medium, for example. More specifically, the present invention may also be applied to a system including a plurality of devices. Alternatively, the present invention may also be applied to an apparatus including one device.

The present invention is also achieved by supplying a storage medium storing program code of software implementing the function of the above-mentioned exemplary embodiment to an apparatus, for a computer (or a CPU or an MPU) in the apparatus to read out and execute the program code stored in the storage medium. In this case, the program code itself read out of the storage medium implements the function of the above-mentioned exemplary embodiment, and the storage medium storing the program code constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-096144 filed Apr. 10, 2009, which is hereby incorporated by reference herein in its entirety.

What is claimed is:

1. An information processing apparatus comprising:
an acquisition unit configured to acquire, from among a plurality of processing orders executable by a printing apparatus according to configuration information of the printing apparatus, information relating to a processing order that is executable by the printing apparatus when a received print job is output as an output product, based on a job ticket included in the received print job;
a determination unit configured to determine a processing order to be executed by the printing apparatus when the received print job is output, based on the information acquired by the acquisition unit; and
a generation unit configured to generate a job ticket for the printing apparatus to execute the processing order determined by the determination unit,
wherein the acquisition unit acquires the information relating to the processing order to be executed by the printing apparatus directly from the printing apparatus.

2. The information processing apparatus according to claim 1, wherein the acquisition unit acquires, out of the plurality of processing orders executable by the printing apparatus, information relating to processing orders in which the printing apparatus can execute output processing included in the job ticket at a processing level based on a type of output processing included in the information carried in the job ticket, and acquires, out of the processing orders executable at the processing level, information relating to a processing order that is executable by the printing apparatus when the received print job is output as the output product.

3. The information processing apparatus according to claim 1, wherein the acquisition unit acquires the information relating to the processing order that is executable by the printing apparatus when the received print job is output as the output product, from processing orders excluding a processing order that is nonexecutable by the printing apparatus when output processing is executed according to setting information included in the information carried in the job ticket.

4. The information processing apparatus according to claim 3, wherein the processing order that is nonexecutable by the printing apparatus includes a processing order in which post-processing for integrating content data precedes partial post-processing.

5. The information processing apparatus according to claim 1, wherein the acquisition unit acquires the information relating to a processing order that is executable by the printing apparatus when the received print job is output as the output product, from processing orders excluding a processing order in which an output product different from an output product desired by a client of the received print job is output when output processing is executed according to setting information included in the information carried in the job ticket.

6. The information processing apparatus according to claim 5, wherein the processing order in which the output product different from the output product desired by the client of the received print job is output includes a processing order in which folding processing precedes cutting processing in which a cutting position is shifted by the folding processing.

7. The information processing apparatus according to claim 5, wherein the processing order in which the output product different from the output product desired by the client of the received print job is output includes a processing order in which folding processing precedes punching processing.

8. The information processing apparatus according to claim 1, wherein the acquisition unit acquires information relating to an output processing used to output the received print job from the information carried in the job ticket, and acquires information relating to the processing order corresponding to the acquired information relating to the output processing from an apparatus different from the information processing apparatus.

9. The information processing apparatus according to claim 1, wherein the determination unit determines, when a processing order existing in the information acquired by the acquisition unit includes a plurality of processing orders, the processing order executable in a short processing time out of the plurality of processing orders as a processing order to be executed by the printing apparatus when the received print job is output.

10. The information processing apparatus according to claim 9, wherein the determination unit determines, when the received print job includes folding processing and cutting processing in which a cutting position is not shifted by the folding processing, the processing order in which the folding processing precedes the cutting processing in which the cutting position is not shifted by the folding processing as the processing order to be executed by the printing apparatus when the received print job is output.

11. A method for controlling an information processing apparatus the method comprising:
    acquiring, from among a plurality of processing orders executable by the printing apparatus according to configuration information of the printing apparatus, information relating to a processing order that is executable by the printing apparatus when a received print job is output as an output product, based on a job ticket included in the received print job;
    determining a processing order to be executed by the printing apparatus when the received print job is output, based on the acquired information; and
    generating a job ticket for the printing apparatus to execute the determined processing order,
    wherein the acquiring step acquires the information relating to the processing order to be executed by the printing apparatus directly from the printing apparatus.

12. The method according to claim 11, further comprising acquiring, out of the plurality of processing orders executable by the printing apparatus, information relating to processing orders in which the printing apparatus can execute output processing included in the job ticket at a processing level based on a type of output processing included in the information carried in the job ticket, and acquiring, out of the processing orders executable at the processing level, information relating to a processing order that is executable by the printing apparatus when the received print job is output as the output product.

13. The method according to claim 11, further comprising acquiring the information relating to the processing order that is executable by the printing apparatus when the received print job is output as the output product, from processing orders excluding a processing order that is nonexecutable by the printing apparatus when output processing is executed according to setting information included in the information carried in the job ticket.

14. The method according to claim 13, wherein the processing order that is nonexecutable by the printing apparatus includes a processing order in which post-processing for integrating the content data precedes partial post-processing.

15. The method according to claim 11, further comprising acquiring the information relating to the processing order that is executable by the printing apparatus when the received print job is output as the output product, from processing orders excluding a processing order in which an output product different from an output product desired by a client of the received print job is output when output processing is executed according to setting information included in the information carried in the job ticket.

16. The method according to claim 15, wherein the processing order in which the output product different from the output product desired by the client of the received print job is output includes a processing order in which folding processing precedes cutting processing in which a cutting position is shifted by the folding processing.

17. The method according to claim 15, wherein the processing order in which the output product different from the output product desired by the client of the received print job is output includes a processing order in which folding processing precedes punching processing.

18. The method according to claim 11, further comprising acquiring information relating to an output processing used to output the received print job from the information carried in the job ticket, and acquiring information relating to the processing order corresponding to the acquired information relating to the output processing from an apparatus different from the information processing apparatus.

19. The method according to claim 11, further comprising determining, when a processing order existing in the acquired information includes a plurality of processing orders, the processing order executable in a short processing time out of the plurality of processing orders as a processing order to be executed by the printing apparatus when the received print job is output.

20. The method according to claim 19, further comprising determining, when the received print job includes folding processing and cutting processing in which a cutting position is not shifted by the folding processing, the processing order in which the folding processing precedes the cutting processing in which the cutting position is not shifted by the folding processing as the processing order to be executed by the printing apparatus when the received print job is output.

21. A non-transitory computer-readable storage medium containing computer-executable instructions for controlling an information processing apparatus the computer-readable storage medium comprising:

instructions for acquiring, from among a plurality of processing orders executable by a printing apparatus according to configuration information of the printing apparatus, information relating to a processing order that is executable by the printing apparatus when a received print job is output as an output product, based on a job ticket included in the received print job;

instructions for determining a processing order to be executed by the printing apparatus when the received print job is output, based on the acquired information; and instructions for generating a job ticket for the printing apparatus to execute the determined processing order, wherein the instructions for acquiring acquire the information relating to the processing order to be executed by the printing apparatus directly from the printing apparatus.

* * * * *